No. 871,988. PATENTED NOV. 26, 1907.
A. FAY.
BREAD MIXER.
APPLICATION FILED FEB. 25, 1907.
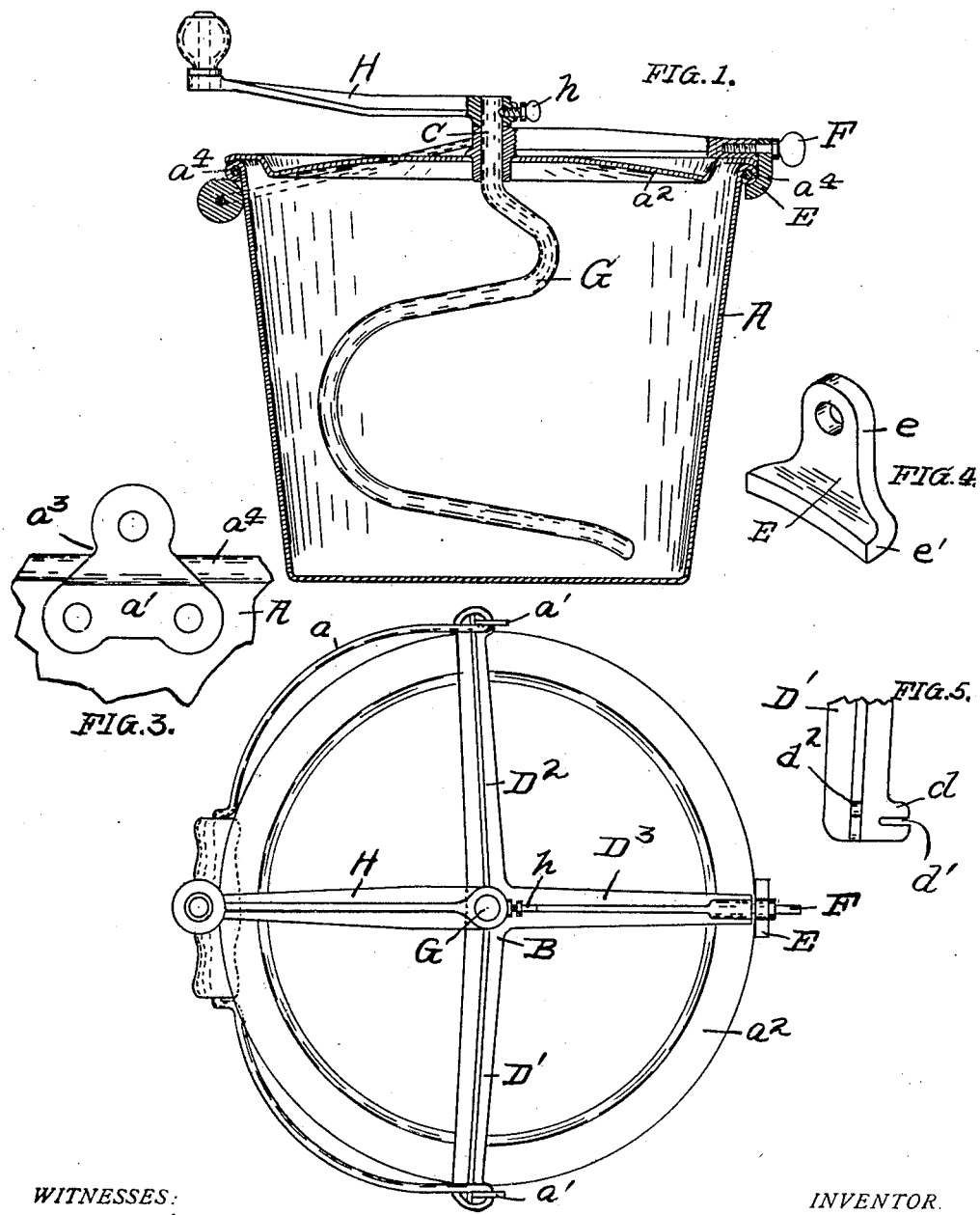
WITNESSES:
Olive Sprau
Hiram S. Mathes
INVENTOR.
Alpheus Fay
BY Brayton G. Richards
ATTORNEY.

UNITED STATES PATENT OFFICE.

ALPHEUS FAY, OF LOUISVILLE, KENTUCKY, ASSIGNOR OF ONE-HALF TO SAMUEL E. RAWLINGS, OF LOUISVILLE, KENTUCKY.

BREAD-MIXER.

No. 871,988.      Specification of Letters Patent.      Patented Nov. 26, 1907.

Application filed February 25, 1907. Serial No. 359,250.

*To all whom it may concern:*

Be it known that I, ALPHEUS FAY, a citizen of the United States, residing at Louisville, in the county of Jefferson and State of Kentucky, have invented certain new and useful Improvements in Bread-Mixers, of which the following is a specification.

The primary object of my invention is to provide an improved bread mixer of economical construction and operation, and my invention consists in the combination and arrangement of parts hereinafter described and claimed.

In the drawings, Figure 1 is a vertical section of a bread mixer embodying my invention; Fig. 2, a top plan view of the same; Fig. 3, an enlarged elevation of one of the bail ears on the side of the bucket employed; Fig. 4, an enlarged perspective view of the locking clamp employed; and Fig. 5, an enlarged top plan view of the end of one of the frame arms.

To contain the dough to be mixed, I preferably employ an ordinary enameled bucket or pail A provided with bail $a$, ears $a'$ and lid $a^2$. A frame B is formed with a central hub C and radiating arms $D'$, $D^2$ and $D^3$. Arms $D'$ and $D^2$ project outwardly from hub C to engage the ears $a'$ for which purpose they are provided with flanges $d$ and slots $d'$. To further secure the arms $D'$ and $D^2$ to ears $a'$, I recess the latter at $a^3$ and form the bail $a$ of such a length as to snap over the rim $a^4$ and thus lock itself over the ends of said arm. Notches $d^2$ are provided in arms $D'$ and $D^2$ for the reception of the bail. Arm $D^3$ projects outwardly from hub C to the rim of the bucket where it is provided with a clamp E adapted to engage under said rim and secured to the end of arm $D^3$ by means of a screw F.

The clamp E preferably consists of a narrow upper portion $e$ and a wider lower portion $e'$ curved vertically to fit rim $a^4$ and curved laterally to the curvature of the bucket. By this construction it will be seen that the clamp will take secure hold of the rim $a^4$ when screw F is tightened.

A mixing shaft G is mounted in hub C which preferably projects through a central opening in lid $a^2$, and a crank handle H is secured to shaft G by means of a countersunk set screw $h$.

In operation, after the necessary ingredients have been placed in bucket A, the lid $a^2$ and frame B with shaft G are secured in position by means of clamp screw F and bail $a$. Then the shaft G is turned by means of handle H until the dough is collected on the shaft in a smooth ball. This will ordinarily take about three minutes. Then the bucket is placed in a warm place to permit the bread to rise, after which the shaft is again operated until the dough again collects in a ball, which will ordinarily occur after a few turns. The dough is then removed by loosening clamp E and bail $a$ and raising the frame and lid from the bucket when the dough may be readily pushed from shaft G and used as desired.

It will be seen that the operative parts of this mixer are in the form of an easily removable attachment which may be readily and securely attached to an ordinary bucket or pail.

While I have illustrated and described the preferred construction for carrying my invention into effect, this may be varied without departing from the spirit of the invention. I therefore do not desire to be limited to the exact construction set forth, but

What I claim as new and desire to secure by Letters Patent is:

1. In a bread mixer, the combination of bucket A; ears $a'$ on bucket A; frame B having radiating arms $D'$, $D^2$ and $D^3$; slots $d'$ in arms $D'$ and $D^2$, adapted to engage the ears $a'$; lid $a^2$ imprisoned between the frame B and the top of the bucket; clamp E adapted to engage the rim of bucket A and secured to arm $D^3$ by set screw F; an operative shaft mounted in frame B; and means for operating the shaft, substantially as described.

2. In a bread mixer, the combination of bucket A; ears $a'$ on bucket A; frame B having radiating arms $D'$, $D^2$ and $D^3$; slots $d'$ in arms $D'$ and $D^2$ adapted to engage the ears $a'$; notches $d^2$ in arms $D'$ and $D^2$; bail $a$ adapted to engage notches $d^2$ and snap over the rim of the bucket; lid $a^2$ imprisoned between the frame B and the top of the bucket; clamp E adapted to engage the rim of bucket A and secured to arm $D^3$ by set screw F; an operative shaft mounted in frame B; and means for operating the shaft, substantially as specified.

3. In a bread mixer, the combination of bucket A having rim $a^4$; ears $a'$ on bucket A and provided with recesses $a^3$; frame B having radiating arms $D'$, $D^2$ and $D^3$; flanges $d$ and slots $d'$ on arms $D'$ and $D^2$, adapted to engage in recesses $a^3$; notches $d^2$ in arms $D'$ and $D^2$; bail $a$ adapted to engage notches $d^2$ and snap over the rim of the bucket; lid $a^2$ imprisoned between the frame B and the top of the bucket; clamp E, having the narrow upper portion $e$ and the wider portion $e'$ curved vertically and laterally to fit rim $a^4$ and the side of the bucket; set screw F securing clamp E to arm $D^3$; an operative shaft mounted in frame B; and means for operating the shaft, substantially as specified.

ALPHEUS FAY.

Witnesses:
 OLIVE SPRAU,
 BRAYTON G. RICHARDS.